United States Patent [19]

Sugiyama

[11] Patent Number: 4,991,765
[45] Date of Patent: Feb. 12, 1991

[54] PUSH ROD MANUFACTURING METHOD
[75] Inventor: Kenji Sugiyama, Numazu, Japan
[73] Assignee: Usui Kokusai Sangyo Kaisha/Ltd., Japan
[21] Appl. No.: 536,180
[22] Filed: Jun. 8, 1990
[30] Foreign Application Priority Data Jun. 13, 1989 [JP] Japan .................................. 1-150031

[51] Int. Cl.⁵ ........................ B23K 11/14; B23K 11/30
[52] U.S. Cl. .................................. 228/164; 228/173.3;
228/196; 228/60; 219/96; 219/107; 29/888.2
[58] Field of Search ..................... 228/164, 173.3, 182,
228/185, 196, 60; 219/98-100, 95, 96, 105, 107;
29/888.2

[56] References Cited

U.S. PATENT DOCUMENTS

| 1,252,142 | 1/1918 | Murray | 228/196 |
| 2,306,772 | 12/1942 | Benson | 219/107 |
| 2,960,080 | 11/1960 | Burnard et al. | 219/107 |
| 2,975,775 | 3/1961 | Macura | 219/107 |
| 3,101,402 | 8/1963 | Gondek | 219/107 |
| 3,246,794 | 4/1966 | Marshall | 228/164 |
| 3,251,127 | 5/1966 | Tonelli | 228/196 |

OTHER PUBLICATIONS

Metals Handbook Ninth Edition, vol. 6, "Projection Welding", pp. 503-524, copyright 1983.

Primary Examiner—Sam Heinrich
Attorney, Agent, or Firm—Anthony J. Casella; Gerald E. Hespos

[57] ABSTRACT

A push rod is manufactured by projection-welding a bottom surface of an end element to a tapered annular end surface of a pipe. To prevent some inclination from arising between the bottom surface of the end element and the annular end surface of the pipe when they are tightly pressed against each other, the bottom surface is formed integrally with a plurality of rose seats of wedge shape in cross section that extend radially with respect to the axial center of the end element. Projection-welding is performed after the rose seats are brought into confronting contact with the tapered annular end surface of substantially triangular shape in cross section.

4 Claims, 2 Drawing Sheets

PUSH ROD MANUFACTURING METHOD

BACKGROUND OF THE INVENTION

1. Field of the Invention

This invention relates to a method of manufacturing a pipe-shaped product with end elements welded to the ends thereof, such as a push rod for operating intake valves and exhaust valves of internal combustion engines.

2. Description of the Prior Art

Hitherto, a pipe-shaped product with end elements, such as a push rod used to operate intake valves and exhaust valves of internal combustion engines, was manufactured by pressing a bottom surface of a carburized and hardened end element having a concave end surface against one tapered annular end surface of a pipe chucked by a chuck by means of an electrode provided at the point of a piston rod of an air cylinder, heating and fusing them by means of large current to perform projection-welding, and similarly projection-welding a bottom surface of another carburized and hardened end element having a convex end surface to the other tapered annular end surface of the pipe.

According to the foregoing conventional method, as shown in FIG. 6A, if an end element 3 is pressed against a tapered annular end surface 2 of a pipe 1 with some inclination because of looseness of a piston rod of an air cylinder or wear of a chuck for a pipe, the tapered annular end surface 2 of the pipe 1 abuts partially on the bottom surface of the end element 3; as a result, an abutting portion of the annular end surface is crushed and deformed. In this case, since the deformation of the tapered annular end surface 2 occurs only radially, the deformation resistance of the annular end surface to crushing increases slightly, so that deformation advances in response to subsequent pressing force. Therefore, the initial inclination can hardly be avoided even by the deformation resistance; thus, such a degree of inclination is retained even after the completion of pressing (see FIG. 6B). Consequently, the width of a welding surface portion at the point of the pipe 1 that is formed by pressing the end element 3 thereagainst becomes non-uniform in the circumferential direction as shown in FIG. 7, or the ratio of largest width to smallest width becomes as large as three.

Since this type of push rod is used in a drive section, including intake valves and exhaust valves, of an internal combustion engine, it is required to have sufficient tensile strength, shear strength and fatigue strength, the fatigue strength must be uniform especially in the circumferential direction, and therefore, the pipe 1 and the end element 3 must be welded together after the welding surface portion is rendered as uniform as possible.

However, where the welding surface portion is non-uniform in the circumferential direction as described above, since the value of current per unit area becomes substantially certain even when welding is performed under the same conditions of voltage, current, welding time, etc., the value of welding current varies largely from portion to portion in the circumferential direction. Consequently, the width of welding, welded condition between the end element and the pipe, extent of influence of heat, strength of welding, and the like become non-uniform in the circumferential direction, with the result that the tensile strength, shear strength, and fatigue strength take small values; thus, no sufficient strength and durability cannot be obtained. Accordingly, in the conventional method, the end element 3 must be accurately set and welded to the tapered annular end surface 2 of the pipe 1 without any inclination, and for uniform welding, high skill is demanded.

SUMMARY OF THE INVENTION

It is an object of the present invention to provide a push rod manufacturing method by which a push rod is manufactured by uniform welding without the need for high skill.

To accomplish the foregoing object, the present invention provides a method of manufacturing a push rod by projection-welding a bottom surface of an end element having a concave or convex end surface to a tapered annular end surface of a pipe, which comprises the steps of integrally forming a plurality of rose seats of wedge shape in cross section on the bottom surface of the end element that extend radially with respect to the axial center of the end element, and performing projection-welding by bringing the rose seats into confronting contact with the tapered annular end surface of substantially triangular shape in cross section. Preferably, the end element is made harder than the pipe, and at least the rose seat portion is hardened.

According to the present invention, the bottom surface of the end element having the radially-extending rose seats of wedge shape in cross section is pressed against the tapered annular end surface of the pipe, and then the two components are subjected to projection-welding.

If the end element is pressed against the pipe with some inclination by any chance, such an inclination can be corrected as follows. First, a portion of the rose seats of wedge shape in cross section formed on the bottom surface of the end element comes to contact with the tapered annular end surface of the pipe. Then, a projecting portion of the pipe that first comes to contact with the rose seats of the end element begins to deform because the rose seats are harder than the annular end surface of the pipe, and the deformation of the annular end surface advances both in the radial direction and in the circumferential direction because of the radially-extending rose seats of wedge shape in cross section; thus, the deformation resistance of the annular end surface increases abruptly. Therefore, the initial inclination cannot be preserved, but becomes gradually small; as a result, some rose seats on the opposite side come to contact with a corresponding portion of the tapered annular end surface of the pipe.

In this way, the larger the imposed pressure, the larger the deformation resistance based on the wedge shape becomes, and finally, the deformation resistance becomes substantially uniform in the circumferential direction, or the inclination becomes negligible.

Therefore, even if the operation of setting the two components together causes some discrepancy, such a discrepancy can be corrected automatically; thus, the end element and the pipe can be welded together after they are uniformly tightened together.

DETAILED DESCRIPTION OF THE PREFERRED EMBODIMENTS

Embodiments of the present invention will now be described with reference to FIGS. 1 through 5.

Figure 1A:
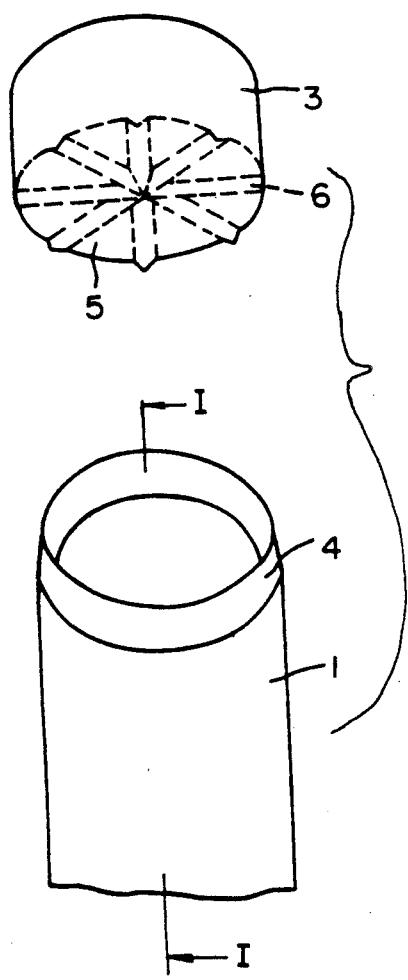
FIG. 1A is a perspective view showing a pipe and an end element according to the present invention.
Figure 1B:
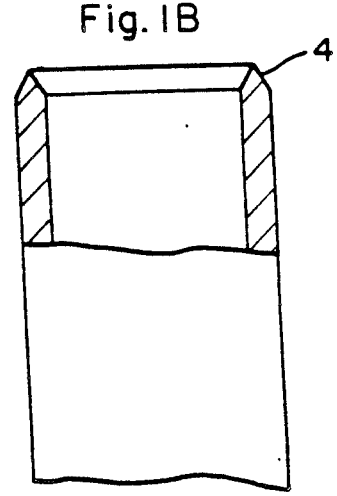
FIG. 1B is a sectional view taken along line I—I in FIG. 1A.

In FIG. 1A showing in perspective view a pipe and an end element according to the present invention, a pipe 1 has a tapered annular end surface 4 whose sectional shape is substantially triangular as shown in FIG. 1B. An end element 3 carburized and/or hardened and made harder than the pipe 1 has a bottom surface on which a plurality of rose seats 6 (eight in number in an embodiment) of wedge shape in cross section are formed that extend radially with respect to the axial center of the end element.

Figure 2A:
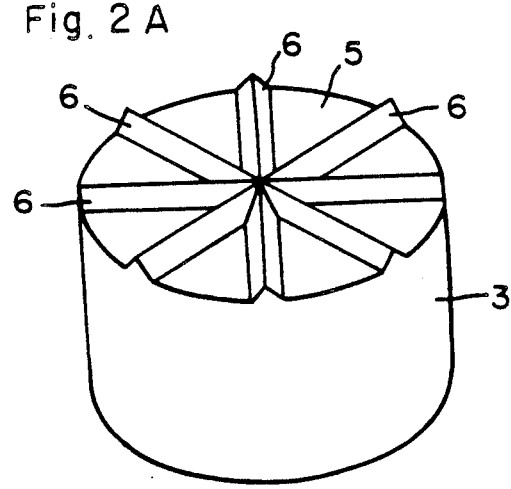
FIG. 2A is a perspective view showing a rose seat portion according to the present invention.
Figure 2B:
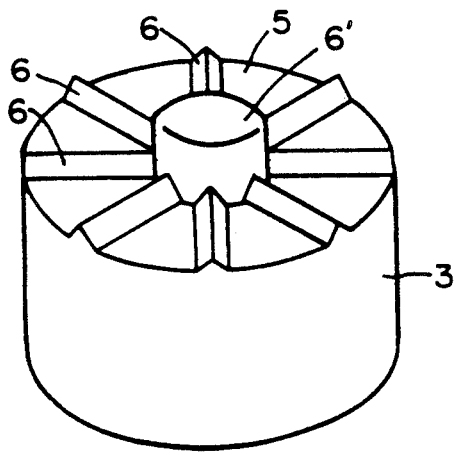
FIG. 2B is a perspective view showing a different rose seat portion according to the present invention.

FIG. 2A shows in perspective view the arrangement of the rose seats of the end element. As illustrated, a bottom surface 5 of the end element 3 has a plurality of rose seats 6 formed thereon extending radially with respect to the axial center, which are wedge-shaped in cross section. If a protrusion 6' is formed in a central portion of the bottom surface as shown in FIG. 2B, this makes it easy to guide the bottom surface to an end of the pipe 1.

In FIG. 1A, the pipe 1 extends downward, and the lower end of the pipe 1 will also have another end element welded similarly thereto. But, description will be given here only with regard to the upper end. Further, although the end element 3 can have either a concave end surface or a convex end surface, description will be given here only with regard to an end element having a convex end surface.

Figure 3:
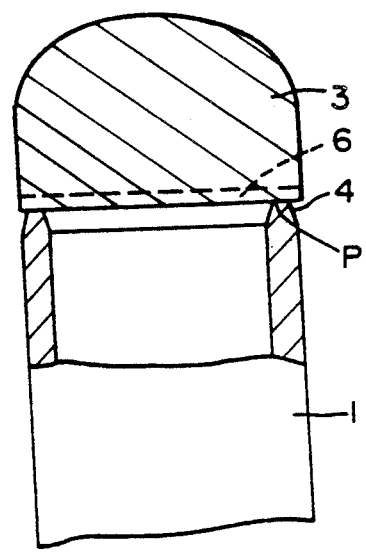
FIG. 3 is a sectional view showing a welding process according to the present invention.

When the pipe 1 and the end element 3 are correctly aligned and set together to perform welding, they can be pressed against each other under the condition that the tapered annular end surface 4 of the pipe 1 faces the rose seats 6 of the end element 3 as shown in FIG. 3; therefore, projection-welding can be performed with respect to a welding surface portion spreading uniformly over the whole circumference.

Figure 5:
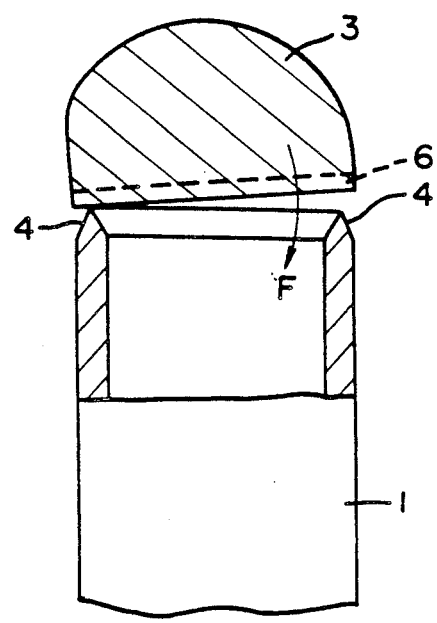
FIG. 5 is a sectional view showing an attitude correction step according to the present invention.
Figure 7:
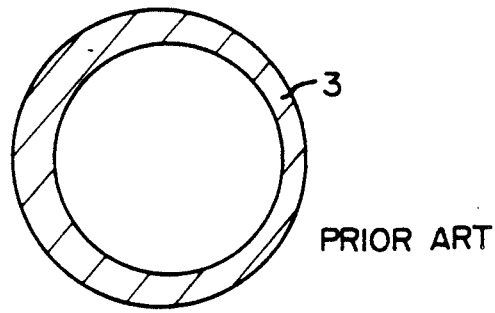
FIG. 7 is a sectional view showing a welding portion in the prior art.
Figure 6A:
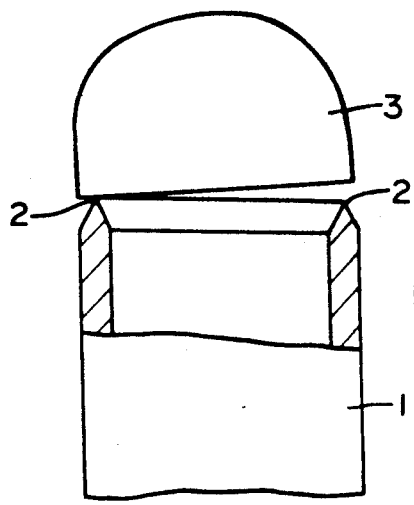
FIGS. 6A and B are side views showing a conventional welding process.
Figure 6B:
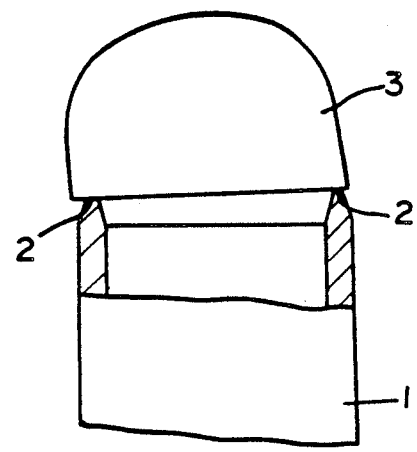

However, if the pipe and the end element are set together with a slight inclination as shown in FIG. 5, a portion of the rose seats 6 of the end element 3 abuts on the tapered annular end surface 4 at one point with leaving a wedge-shaped gap therebetween. Then, when an additional pressure is imposed, the deformation resistance of such an abutting portion increases abruptly to decrease inclination; as a result, some rose seats 6 on the opposite side that are out of contact begin to abut on the tapered annular end surface 4. A further pressure as imposed increases the deformation resistance of a now abutting portion, thereby imposing an attitude correction moment F on the end element 3 as illustrated by the arrow in FIG. 5, whereby all the rose seats 6 come to abut on the tapered annular end surface 4 substantially uniformly in the circumferential direction. This provides a welding surface portion extending uniformly over the whole circumference, with the result that the pipe and the end element are correctly set together as shown in FIG. 3. Under the foregoing condition, projection-welding will be performed.

Figure 4:
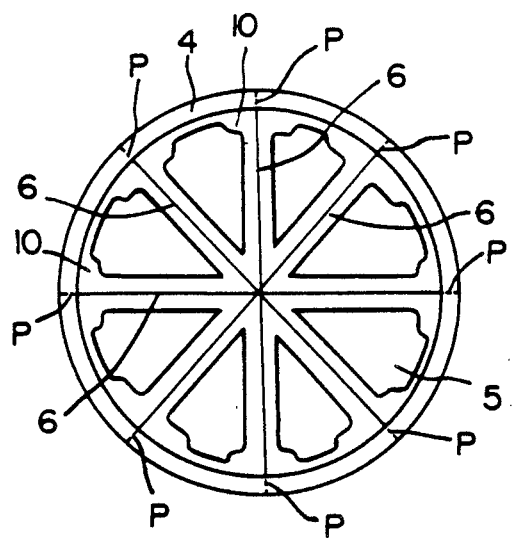
FIG. 4 is a plan view showing a welded state according to the present invention.

Projection-welding according to the present invention will be described. As shown in FIGS. 3 and 4, upon application of pressure, the rose seats 6 of the end element 3 and the tapered annular end surface 4 of the pipe 1 come to uniform contact with each other at eight points symmetrically with respect to the axial center to define a welding portion P where current flows. The electrical resistance R of the welding portion P is proportional to $\rho/S$ where S is the area of the welding portion P and $\rho$ is the specific resistance.

Since the area S is very small, the electrical resistance R is large; therefore, at the time of welding using a welding current i, a large joule heat $i^2R$ is generated in the welding portion P. By this joule heat $i^2R$, the rose seats 6 and the tapered annular end surface 4 are uniformly welded together at one time at eight points symmetrical with respect to the axial center. Then, when welding is advanced while pressing the end element 3 and the pipe 1 against each other, the welded portions expand progressively from the initial eight points stably and uniformly toward the whole circumference, whereby the end element 3 is rigidly welded to the pipe 1.

Initially, large joule heat is generated at several welding points symmetrical with respect to the axial center of the rose seats 6 or the tapered annular end surface 4, and then, this joule heat is instantly transferred to the tapered annular end surface of the pipe 1 and to the symmetrical rose seats 6 of small volume. Therefore, the rose seats 6 and the tapered annular end surface of the pipe 1 become uniform and high in temperature as soon as welding is started; thus, welding can be performed very smoothly and stably.

FIG. 4 shows welding portions of the rose seats 6 and the pipe 1. The tapered annular end surface 4 is welded to the bottom surface 5 with uniform width, and the rose seats 6 of the hardened end element 3 bite into the tapered annular end surface 4 to provide a deformed enlarged portion 10, whereby the pipe 1 and the end element 3 are tightly welded together uniformly.

Although having described the process of welding the end element to the push rod, the present invention can be applied to other fields of welding an end element to a pipe.

As described in greater detail, according to the present invention, even if the end element is set on the pipe with some inclination, such an inclination can be corrected, and the end element can be rigidly welded to the pipe uniformly in the circumferential direction; therefore, almost all products or push rods are non-defective, and they are superior in tensile strength, shear strength, fatigue strength and durability and accurate in dimensions.

What is claimed is:

1. A method of manufacturing a push rod by projection-welding a bottom surface of an end element having a concave or convex end surface to a tapered annular end surface of a pipe, comprising the steps of integrally forming a plurality of rose seats of wedge shape in cross section on the bottom surface of the end element that extend radially with respect to the axial center of the end element, and performing projection-welding by bringing the rose seats into confronting contact with the tapered annular end surface of substantially triangular shape in cross section.

3. A push rod manufacturing method according to claim 1, wherein the end element is made harder than the pipe.

3. A push rod manufacturing method according to claim 1, wherein at least the rose seat portion of the end element is hardened.

4. A push rod manufacturing method according to claim 1, wherein a protrusion is formed in a central portion of the rose seat portion.

* * * * *